Jan. 10, 1961 P. TOMMARCHI 2,967,330
METHOD OF MAKING A HOLLOW BODY
Filed May 12, 1958 2 Sheets-Sheet 1
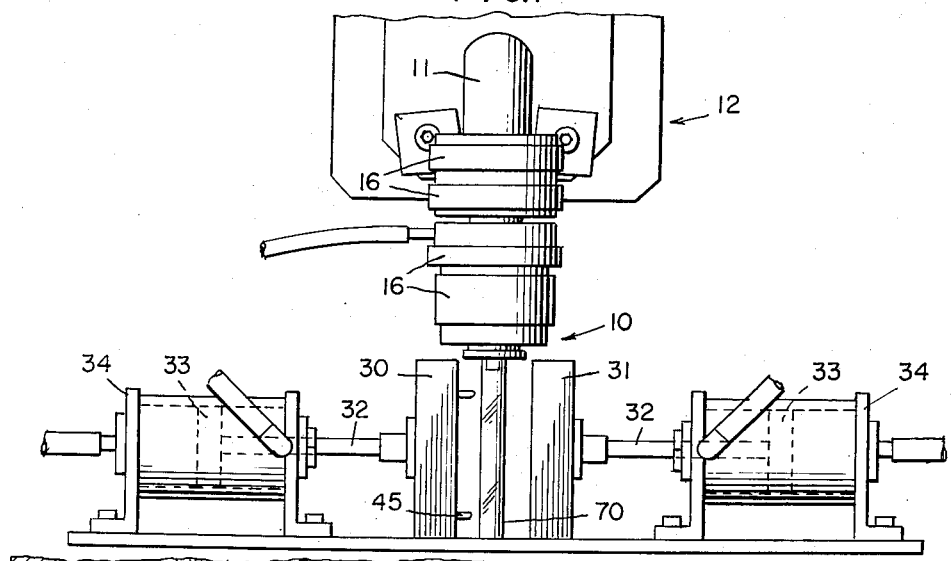
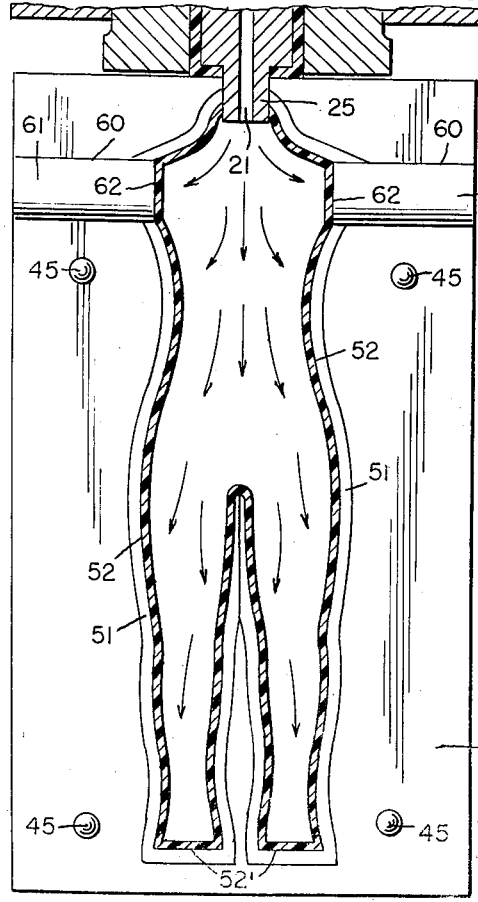
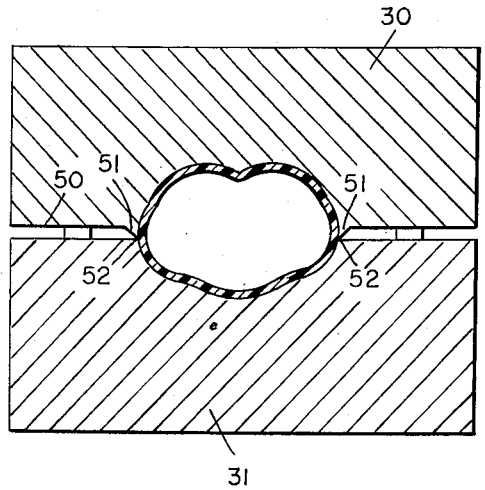
INVENTOR.
Paul Tommarchi
BY
Shoemaker & Mattare
ATTYS.

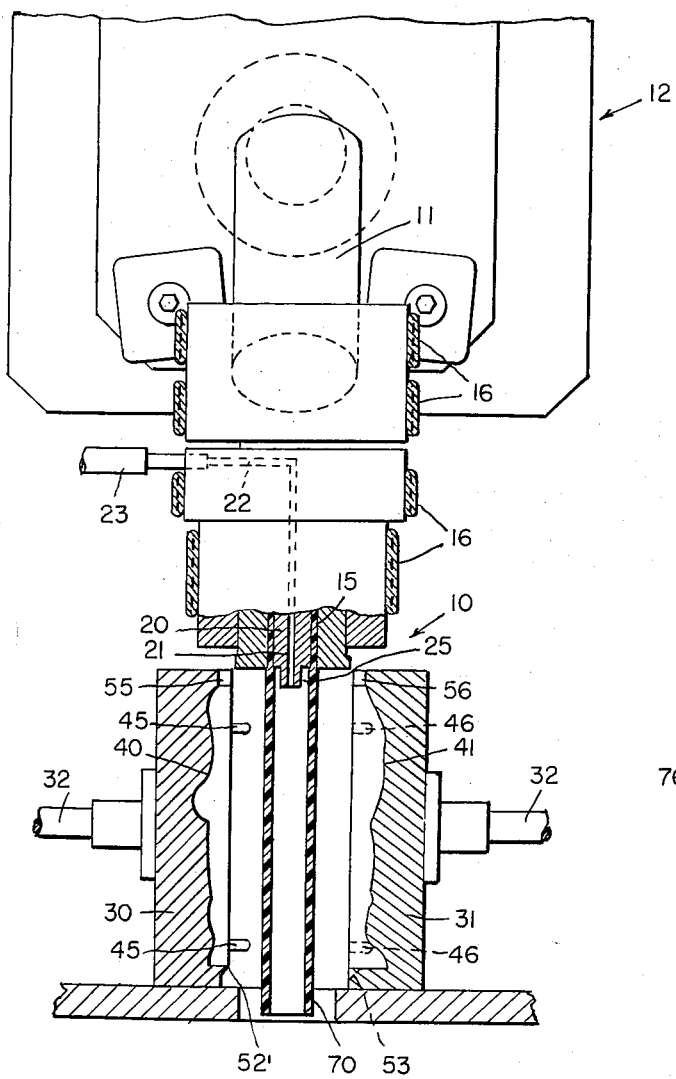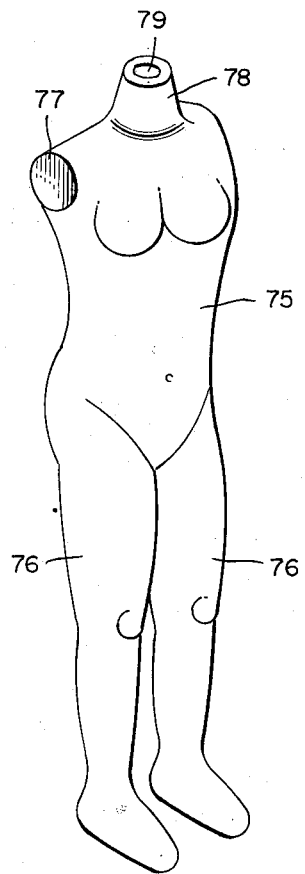
Jan. 10, 1961 — P. TOMMARCHI — 2,967,330
METHOD OF MAKING A HOLLOW BODY
Filed May 12, 1958 — 2 Sheets-Sheet 2
FIG.2
FIG.5
INVENTOR.
Paul Tommarchi

United States Patent Office 2,967,330
Patented Jan. 10, 1961

2,967,330
METHOD OF MAKING A HOLLOW BODY

Paul Tommarchi, Douglaston, N.Y., assignor to Plastic Molded Arts Corp., Long Island City, N.Y., a corporation of New York Filed May 12, 1958, Ser. No. 734,476

1 Claim. (Cl. 18—55)

The present invention relates to a new and novel method of manufacture of hollow bodies, and more particularly is concerned with hollow doll bodies having a torso and leg portions.

In the manufacture of doll bodies, the body is often constructed so as to be formed of relatively thin walls, and is completely hollow. The present invention relates especially to the manufacture of this type of doll body wherein a neck portion is formed integral with the torso and is provided with an opening for securing a head member thereon. The sockets for receiving the arms may be either closed or open in accordance with the type of arms which it is desired to attach to the torso.

This type of doll body is of a nature which permits mass production thereof and various modes of construction and methods of manufacture have been heretofore employed in this art which have provided relatively satisfactory results but have involved excessive cost. Injection molding has been extensively employed in the construction of such doll bodies but this method has been replaced to a large extent by vinyl rotary systems wherein centrifugal force is employed for forming the doll bodies within the molds. These methods as employed in the prior art have proved to be excessively expensive due to the cost of the dies and maintenance required of the equipment, and further because of the large amount of man hours of labor required during such manufacturing operations.

According to the present invention, the doll body comprises a one-piece hollow blow molded plastic body including a torso and a pair of pinched and trimmed depending legs formed integral with the torso. This doll body construction is manufactured in accordance with a new and novel method.

According to the method of the present invention, a suitable thermoplastic material is heated until it is plasticized and then a tube of the plastic material is formed as by extrusion. The tube is then encased between the halves of a metallic mold which pinches and cuts the tube so as to form the torso and a pair of depending legs integral therewith. A gas under pressure is then introduced within the tube to expand the tube into engagement with the walls of the mold, and the finished doll body is subsequently removed from the mold after a suitable time delay which permits the material of the doll body to harden.

The method according to the present invention provides substantial and unexpected reductions in the cost of manufacture of doll bodies. The dies required according to the present invention are much cheaper than those required with prior art methods, and the maintenance required of the manufacturing equipment is reduced to a bare minimum. The amount of labor required in the manufacture is also substantially reduced and the necessity of trimming the finished doll body which has arisen in the prior art is completely eliminated in the present invention. The cost per unit of manufacture according to the present invention is on the order of one-fifth the cost when manufacturing doll bodies according to the prior art, and it is accordingly apparent that the present invention provides an unusually effective step forward in the art.

An object of the invention is the provision of new and novel method for manufacturing hollow body means.

A further object of the invention is to provide a method of manufacturing hollow body means wherein the maintenance and labor required are reduced to a minimum.

Yet another object is the provision of a method of manufacture wherein the unit cost is substantially reduced and the necessity of trimming the finished article is eliminated.

A still further object of the invention is to provide a new and novel method of manufacturing hollow body means which requires a minimum of skill and effort and is substantially automatic in operation yet which provides efficient reliable results in operation.

Other objects and many of the attendant advantages of the present invention will become more apparent when considered in connection with the accompanying specification and drawings, wherein:

Fig. 1 is a general view of apparatus for carrying out the present invention,

Fig. 2 is an enlarged view, partly in section, of a portion of the apparatus shown in Fig. 1, Fig. 3 is a view partly in section illustrating one die member and a section through a doll body formed therein, Fig. 4 is a cross sectional view illustrating the manner in which the doll body is pinched and trimmed between the two halves of the die, and Fig. 5 is a perspective view of the finished doll body according to the present invention.

Referring now to the drawings wherein like reference characters designate corresponding parts throughout the several views, there is shown in Figs. 1 and 2 the apparatus employed according to the present invention wherein an extrusion head indicated generally by reference numeral 10 is secured in the conventional manner to the outlet 11 of a conventional injection molding machine indicated by reference numeral 12. While the extrusion head has been shown as connected to an injection molding machine, it can just as well be employed with a screw type extruding machine, if desired.

The molding machine supplies a suitable plastic material such as polyethylene through outlet 11 downwardly through an opening 15 extending longitudinally through the extrusion head. As the plastic flows downwardly within the extrusion head, the plastic is maintained in a plasticized condition at a suitable extrusion temperature such as approximately 350° F. by a plurality of conventional heating bands 16 which extend circumferentially about the extrusion head. These heating bands may be electric resistance elements connected to a suitable source of energy (not shown).

A substantially cylindrical forming member 20 is mounted centrally within the opening 15 in the extrusion head for providing a substantially annular space therebetween which produces a tubular form when the plastic material is forced through the extrusion head. Forming member 20 has a central longitudinally extending opening 21 formed therethrough which is connected through a radially extending conduit formed in the extrusion head to a gas line 23. Gas line 23 is connected to a suitable source of gas under pressure (not shown), such as a compressor or the like, which provides a gas under a pressure of approximately 45 to 65 p.s.i. which has been found to be a suitable range of pressures, although various other pressures may be employed in accordance with the size and material of the manufactured doll bodies. Although various gases may be employed, air is suitable for the present invention and, of course, it is easily obtained whereby the surrounding atmosphere is conventionally employed. At the lower end of forming member 20, a gas nipple 25 of reduced diameter is provided, and opening 21 extends therethrough.

The two halves of the mold 30 and 31 are formed of cast steel or similar material and are each secured to similar rods 32 connected to conventional pistons 33 mounted in hydraulic cylinders 34. Hydraulic cylinders may be operated in the conventional manner by suitable control means (not shown) so as to reciprocate pistons 33 within the cylinders and move the two halves of the mold toward and away from one another.

As seen in Fig. 2, mold member 30 has indented therein as indicated by line 40 the configuration of the rear longitudinal portion of the doll body, while mold member 31 has indented therein as indicated by line 41 the forward longitudinal portion of the doll body. It is apparent that when the two halves of the mold are pressed together, mold members 30 and 31 will cooperate to form the complete doll body. A pair of pins 45 is disposed at each side of mold member 30 and projects toward member 31. Mold member 31 is provided with cooperating apertures 46 which receive the four pins projecting from member 30 for guiding the two halves of the mold accurately into cooperating relationship with one another.

As seen in Fig. 4, the face 50 of mold member 30 is provided with surfaces 51 extending at an angle of approximately 45° thereto thereby defining sharp cutting edges 52 adjacent to the indented body forming portion of the mold. This sharp edge 52 extends about the entire periphery of the indented portion of the mold member 30 such that when the two halves of the mold are brought into contacting engagement with one another as shown in Fig. 4, the tube which extends therebetween will be pinched and trimmed automatically such that no further trimming operations are necessary. It should be noted in Fig. 2 that the lower portion 52' of the sharp cutting edge seats in a suitable recess 53 provided in mold member 31 for pinching off the lower end of the tube when the two halves of the mold are brought together.

The upper ends of each of mold members 30 and 31 are provided with substantially semi-cylindrical recesses 55 and 56, respectively, which are adapted to snugly fit about the gas nipple 25 when the two halves of the mold are brought together. As seen in Fig. 3, recesses 60 which might serve as arm openings have plugs 61 therein such that the inner surface 62 thereof defines the outer surface of the arm sockets of the completed doll body. It is apparent that the plugs may be replaced by other members if it is desired to form arm portions or arm openings in the completed doll body.

In operation, the thermoplastic material is supplied through outlet 11 of the molding machine, and as the material passes downwardly through the extrusion head, heating bands 16 maintain the material in a plasticized condition. The material is extruded about forming member 20 as seen most clearly in Fig. 2, and is formed into a downwardly extending tube 70. After the tube has been extruded to a predetermined length, hydraulic cylinders 34 are actuated so as to urge the two halves of the die toward one another. Pins 45 on mold member 30 will enter apertures 46 in mold member 31, cutting edges 52 will pinch and cut the tube so as to remove excess material, and the two semi-cylindrical cut out portions 55 and 56 at the top of the mold members will tightly engage gas nipple 25 thereby cutting off the top of the tube with the gas nipple extending downwardly within the tube as seen most clearly in Fig. 3. The lower end of the tube is cut off by the lower portion 52' of the cutting edges.

It is important to note at this time the novel interaction of the two halves of the die mold as they are urged toward one another in cooperation with the hollow tube extending therebetween. As seen most clearly in Fig. 3, it is apparent that the lower portion of the tube is substantially bisected and pinched together between the two leg portions of the doll body, thereby separating the two legs from one another, and yet maintaining the leg portions integral with the torso portion of the body. This is an important and novel feature of the present invention since it permits a one-piece doll body to be efficiently and expeditiously formed from a hollow tube of pliable material.

After encasing the tube within the two halves of the mold, compressed air or other suitable gas is introduced through the gas nipple to the interior of the tube, thereby forcing the tube outwardly into engagement with the walls of the mold in a uniform manner. It has been found that the application of approximately 45 to 65 p.s.i. pressure for a period of about 10 to 12 seconds insures proper formation of the doll body when the body is approximately 6 to 9 inches in height, this being a common size of doll in the art. It is apparent that considerably larger or smaller dolls may also be manufactured according to the present invention, and that various materials may be employed in such manufacture.

The mold is held in the closed position for a predetermined period of time to effect suitable hardening of the material of the doll body, whereupon the halves of the mold may be moved relatively away from one another into a separated position. The completed doll body is then withdrawn from the mold, since the doll body will usually adhere to one half of the mold while the other half is completely separated therefrom. The doll body may be ejected from the mold in any suitable manner such as applying a blast of air to forcibly eject it from the mold, or it is apparent that it can be mechanically or manually removed if desired. After removal of the doll body, the apparatus is immediately in condition for a subsequent cycle and another tube of material is immediately extruded through the extrusion head.

The finished doll body is illustrated in Fig. 5 and it is apparent that the finished article according to the present invention comprises a hollow one-piece blow molded body means formed of a suitable material such as plastic including a torso portion indicated by reference numeral 75 having formed integral therewith a plurality of appendages or leg portions 76 which project downwardly therefrom. The arm sockets 77 in this instance are comprised of flat wall portions, and the neck portion 78 is provided with an opening 79 therein within which a head member may be suitably secured. The desired surface effect of such plastic material is obtained by liquid honing the body forming indented portions of mold members 30 and 31. The mold may also be water cooled in a conventional manner during operation, if desired.

It is apparent that the unitary body means according to the present invention is formed in a simple and expeditious manner and the leg portions are formed integral with the torso portion by pinching and severing the extruded tube longitudinally thereof. The sharp cutting edges of the die mold efficiently remove all excess material thereby eliminating the necessity of trimming the doll body after removing the body from the mold.

The cost of the dies according to the present invention is considerably less than the cost of dies employed according to known practice, and the maintenance of the equipment employed in the present method is reduced to a minimum. Whereas as many as 150 persons have been required in manufacturing processes in the prior art in order to produce approximately 15,000 doll bodies per day, a like number of doll bodies may be manufactured according to the present invention by three persons employing apparatus as disclosed herein. It is accordingly evident that the savings in the cost of manufacture are substantial and yet the method according to the present invention may be performed with a minimum of effort and skill while still providing efficient and reliable results.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by this claim.

I claim:

The method of making a hollow doll body including a torso and legs integral therewith, the legs being separated from one another, comprising heating a thermoplastic material to cause the material to assume a plasticized condition, extruding the plasticized material in the form of a downwardly extending open ended cylindrical tube having a wall of uniform thickness, encasing the tube within a forming means, cutting and pinching the lower end portion of the tube to close the lower open end of the tube and to remove excess material, cutting off the top of the tube and leaving an opening at the top end of the tube, severing the tube to bisect the tube from the lower end thereof to a point approximately midway between the lower closed end of the tube and the open upper end of the tube, pinching the severed portion of the lower end of the tube to provide two tubular portions separated from one another throughout the length thereof, but joined together at the upper portion thereof, expanding the tube into the configuration of such hollow doll body, and permitting the plasticized material of the tube to harden.

References Cited in the file of this patent

UNITED STATES PATENTS

| | | |
|---|---|---|
| Re. 23,564 | Hobson | Oct. 14, 1952 |
| 1,592,536 | O'Neill | July 13, 1926 |
| 1,710,989 | Kelly | Apr. 30, 1929 |
| 2,579,030 | Mills | Dec. 18, 1951 |
| 2,622,369 | Beal | Dec. 23, 1952 |
| 2,631,407 | Rempel | Mar. 17, 1953 |
| 2,724,860 | Strong | Nov. 29, 1955 |
| 2,781,551 | Richerod | Feb. 19, 1957 |
| 2,810,934 | Bailey | Oct. 29, 1957 |

FOREIGN PATENTS

| | | |
|---|---|---|
| 149,473 | Australia | Dec. 19, 1952 |
| 167,535 | Australia | Apr. 24, 1956 |
| 1,123,500 | France | June 11, 1956 |